Figure 19:
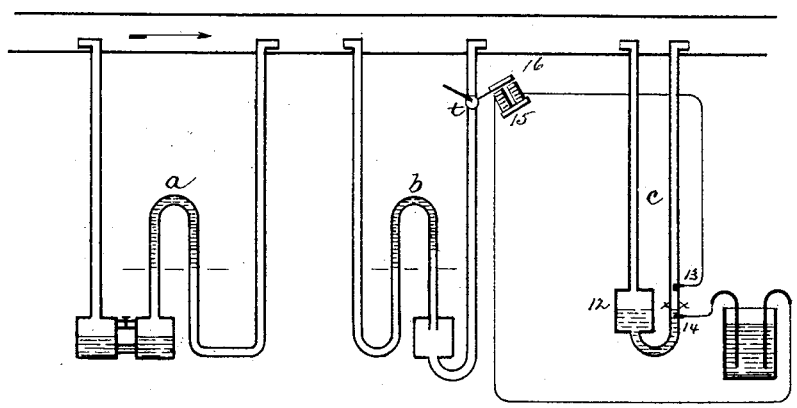

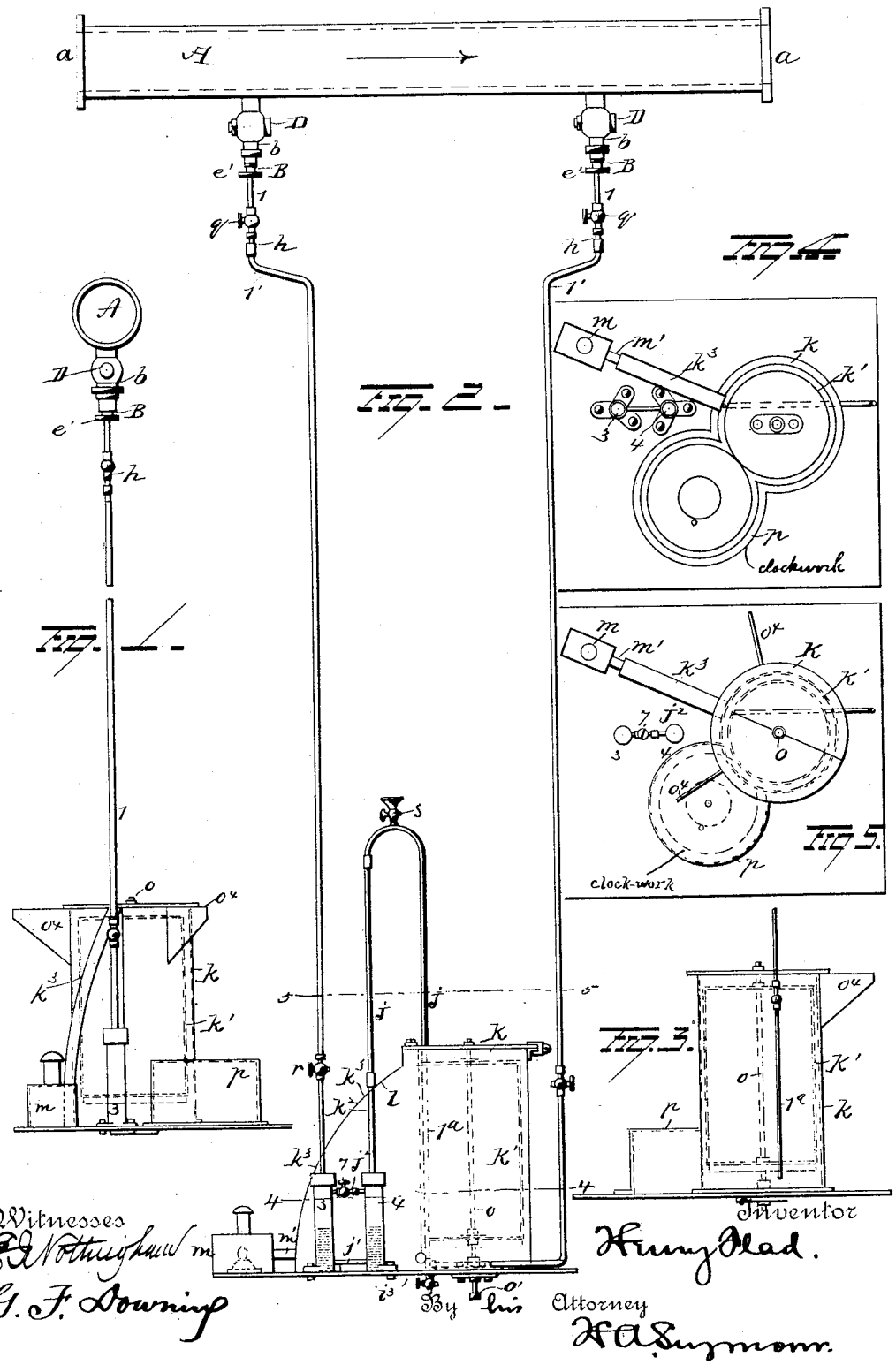

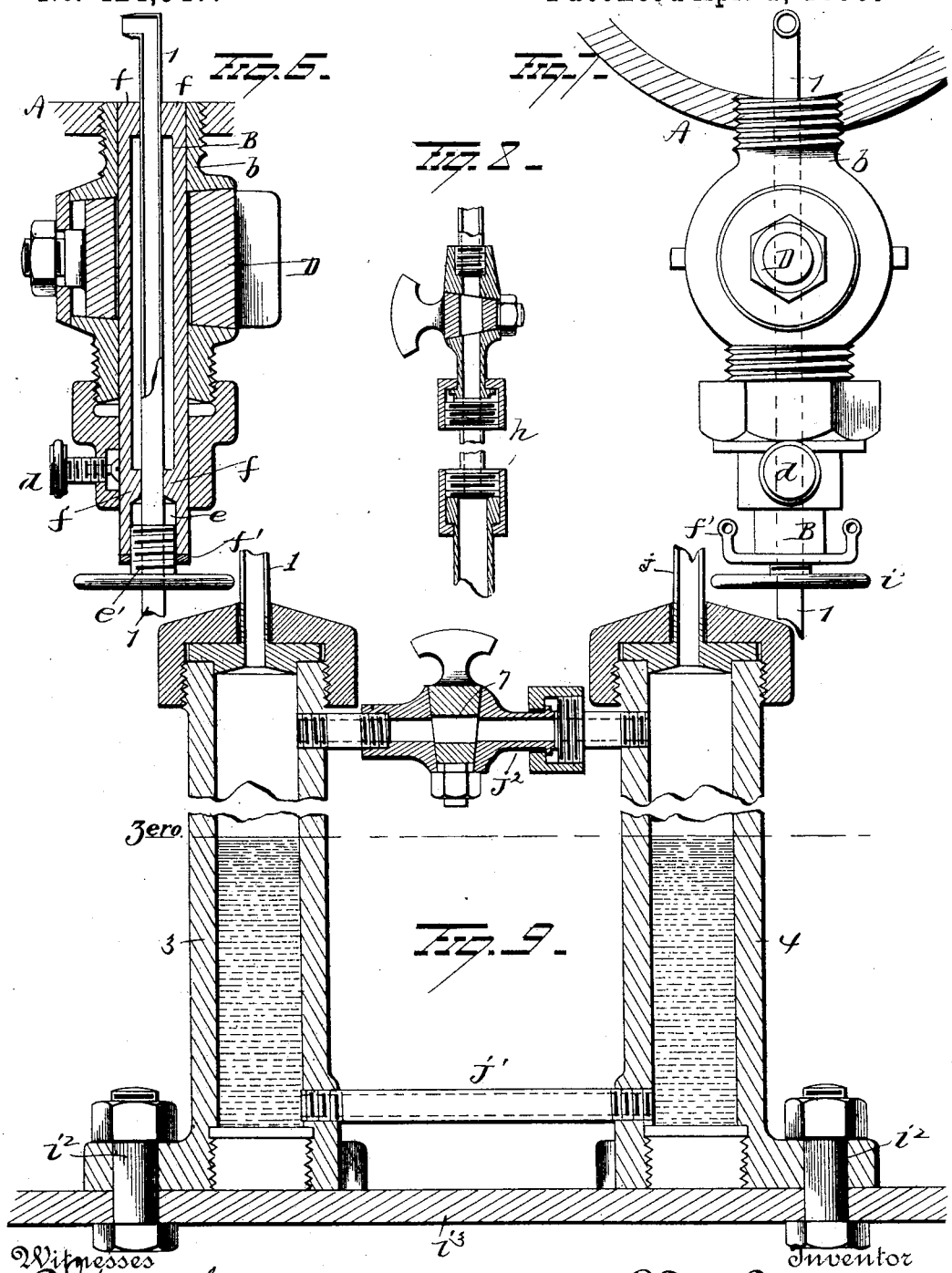

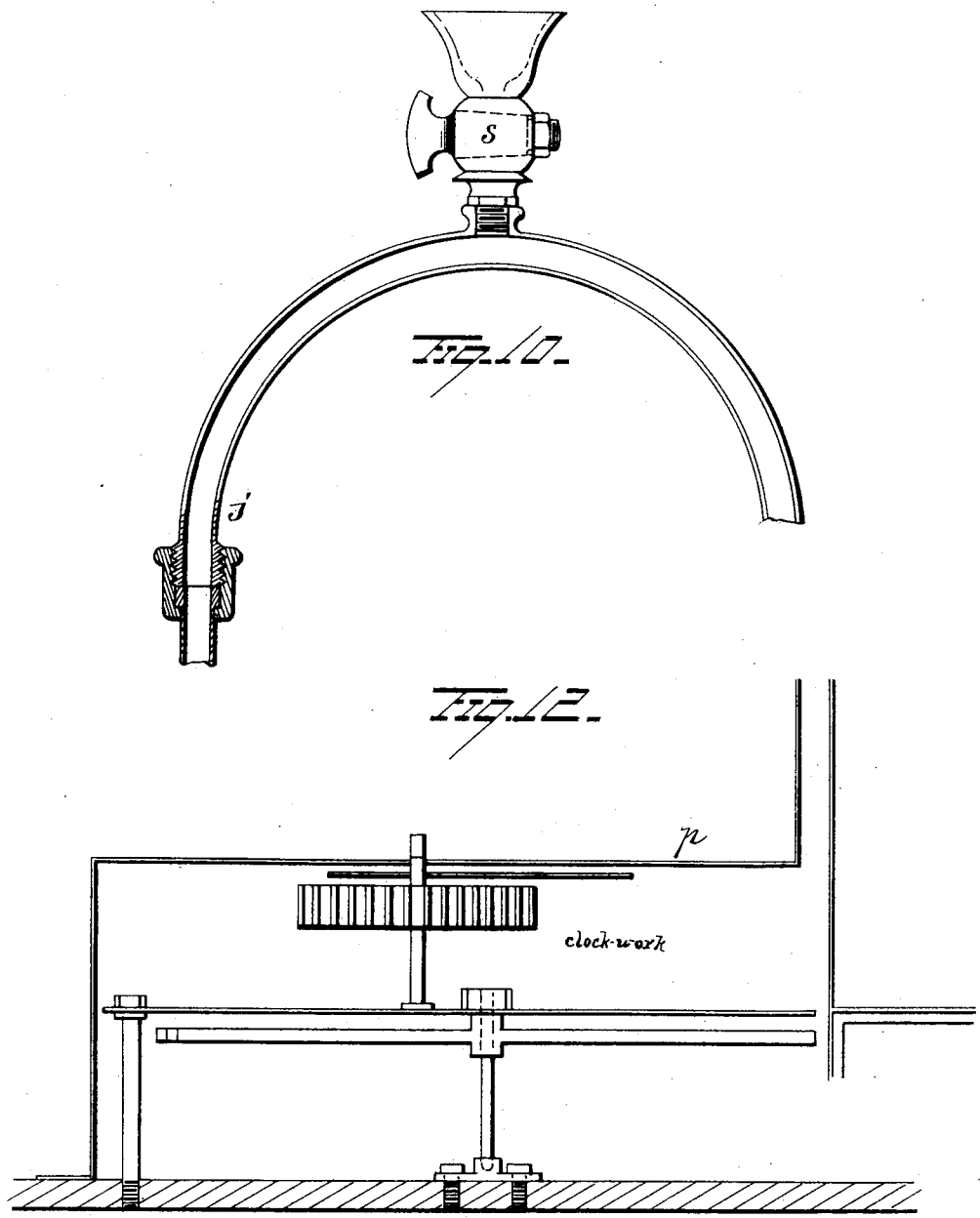

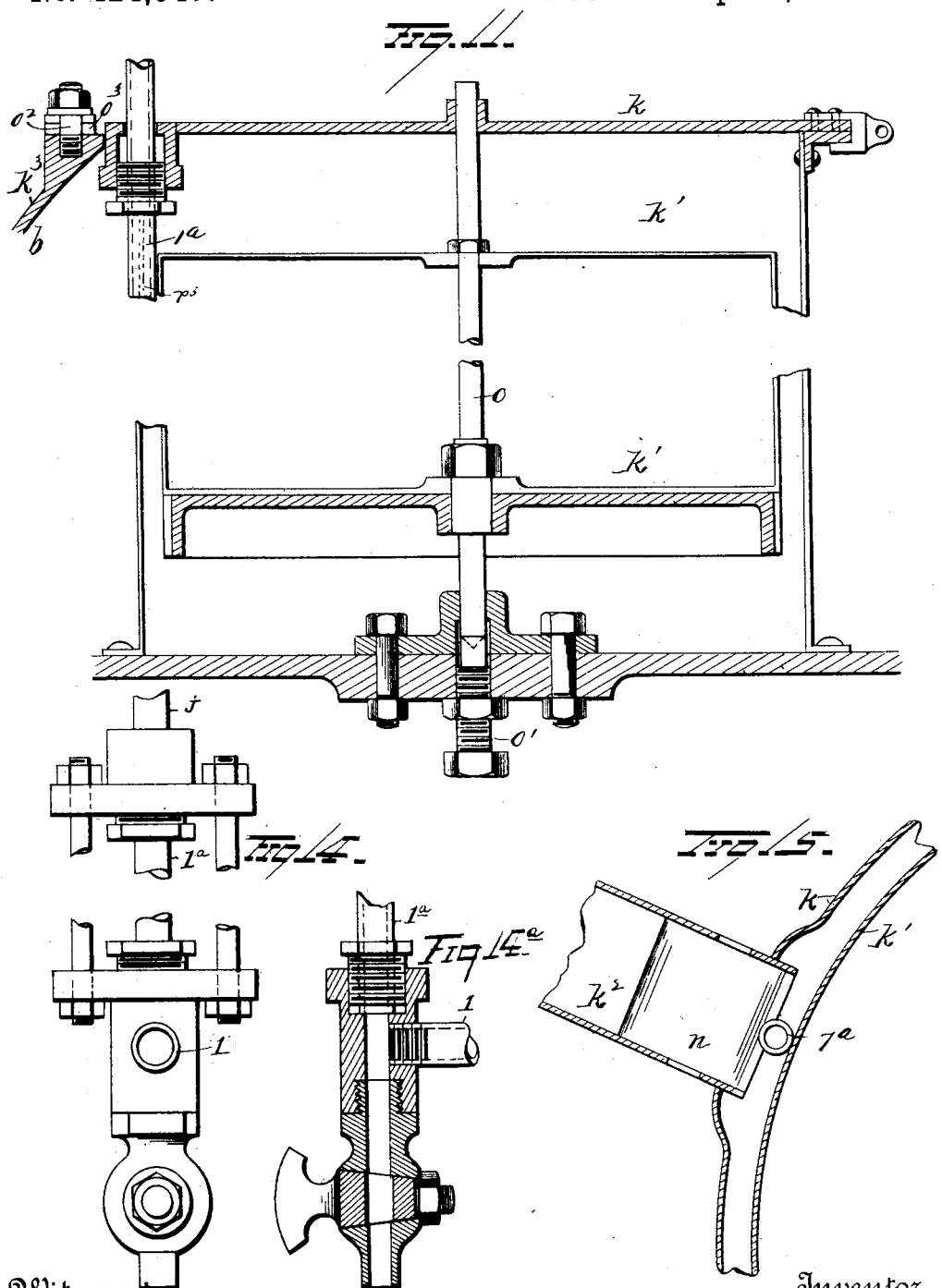

(No Model.) 8 Sheets—Sheet 5.
H. FLAD.
RECORDING VELOCIMETER.
No. 424,547. Patented Apr. 1, 1890.
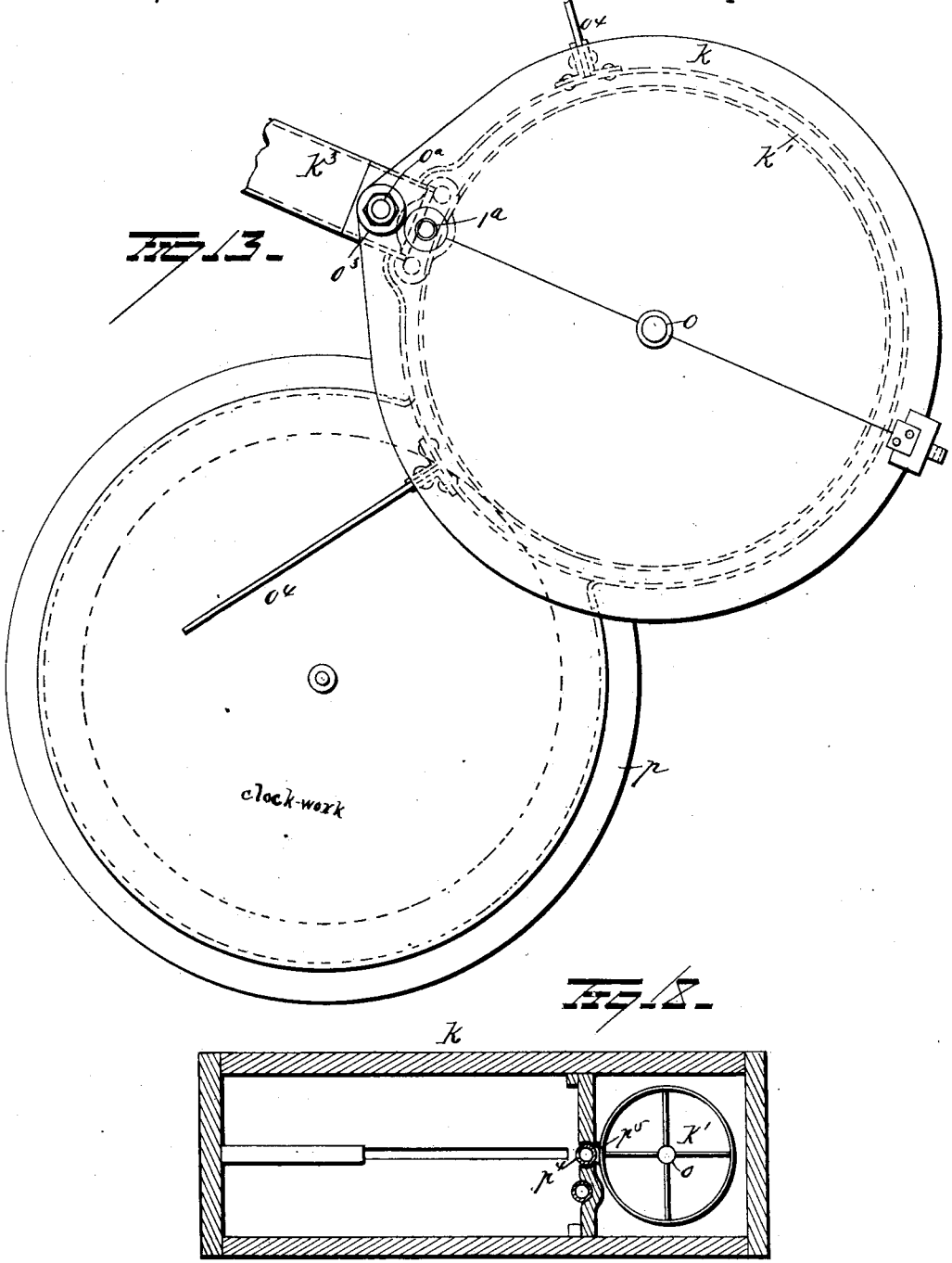
Witnesses
Inventor
Henry Flad.
By his Attorney

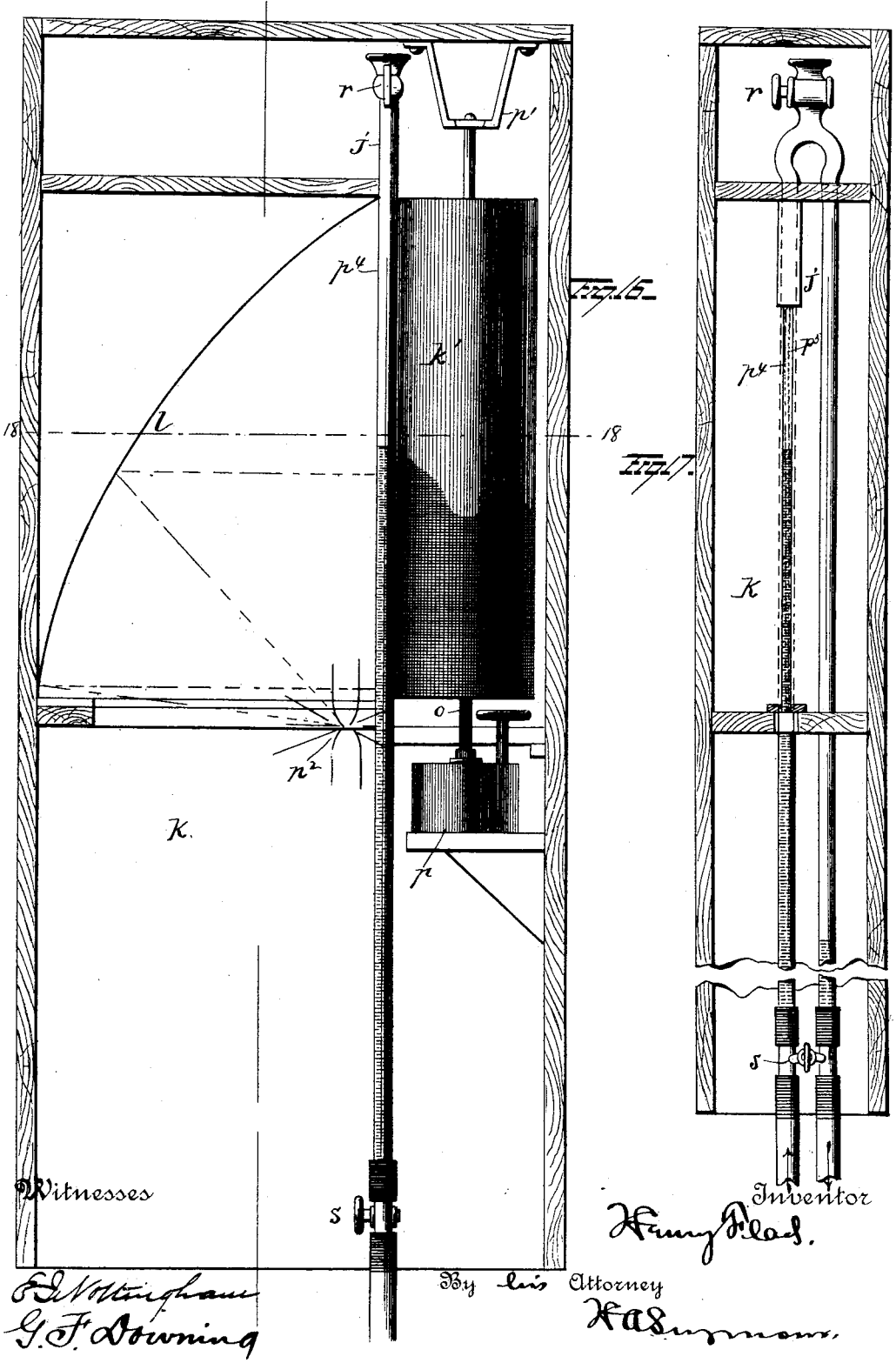

(No Model.) 8 Sheets—Sheet 8.
H. FLAD.
RECORDING VELOCIMETER.
No. 424,547. Patented Apr. 1, 1890.
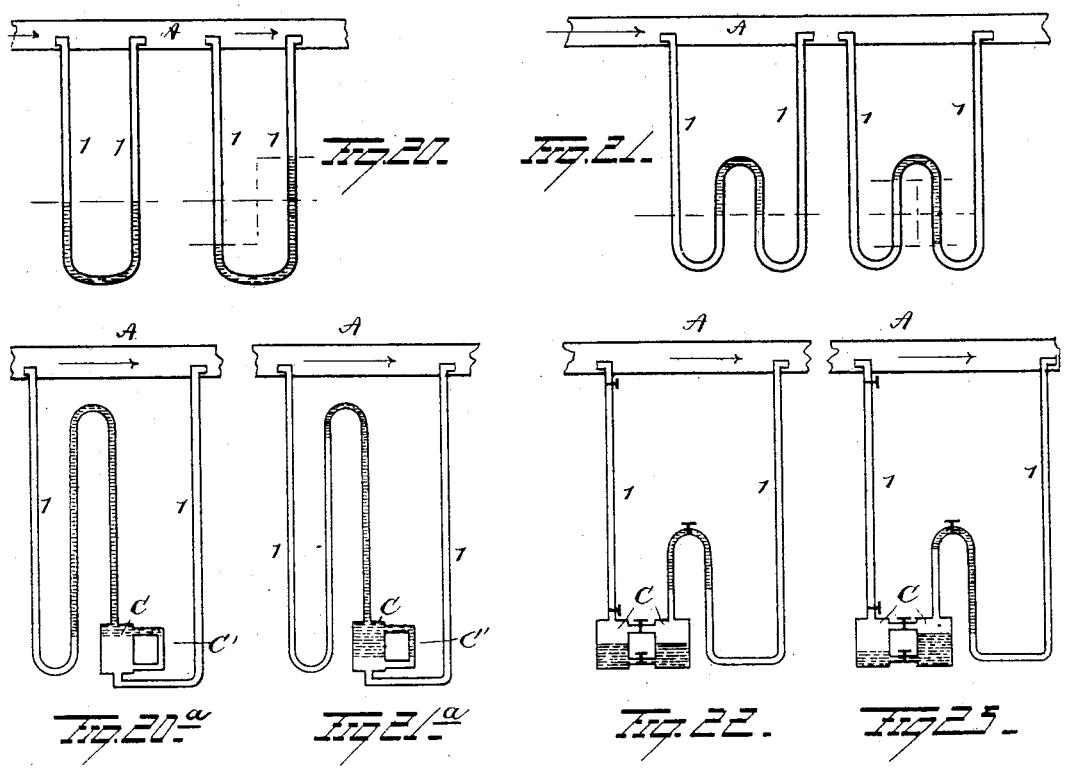
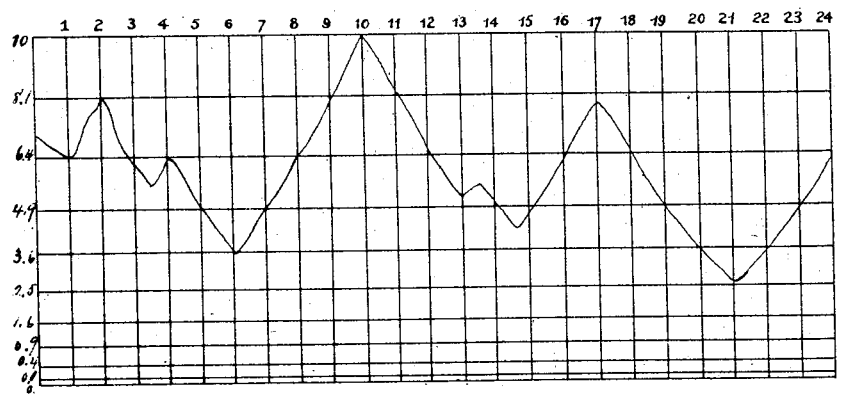
Witnesses
Inventor
Henry Flad.
By his Attorney

UNITED STATES PATENT OFFICE.

HENRY FLAD, OF ST. LOUIS, MISSOURI.

RECORDING-VELOCIMETER.

SPECIFICATION forming part of Letters Patent No. 424,547, dated April 1, 1890.

Application filed July 12, 1889. Serial No. 317,291. (No model.)

*To all whom it may concern:*

Be it known that I, HENRY FLAD, of St. Louis, in the State of Missouri, have invented certain new and useful Improvements in Velocimeters; and I do hereby declare the following to be a full, clear, and exact description of the invention, such as will enable others skilled in the art to which it appertains to make and use the same.

My invention relates to an improvement in velocimeters; and it consists in mechanism for utilizing the two forces—that is, the impact and the draft or suction—of a running fluid, so as to cause two columns of fluid to be respectively acted upon simultaneously by this impact and suction of the stream upon the ends of said columns, whereby the fluctuations in height of an interposed fluid of different specific gravity from the columns of fluid caused by the varying impact and suction, due to the varying velocity of the passing stream, is recorded upon a sheet of sensitized paper by the action of a ray of light upon the interposed fluid.

In the accompanying drawings, Figure 1 is a front view of one practical form of apparatus employed. Fig. 2 is a side view of the same, and Fig. 3 is a rear elevation. Fig. 4 is a sectional view on the line 4 4 of Fig. 2. Fig. 5 is a plan view taken on the line 5 5 of Fig. 2. Fig. 6 is a sectional view of the ferrule connecting the vertical pipes to the main. Fig. 7 is an elevation of the same. Fig. 8 is a detail view of a form of pipe-coupling used. Fig. 9 is a sectional view through the mercury-cylinders. Fig. 10 is a detail of the siphon-tube. Fig. 11 is an enlarged sectional view of the revolving cylinder and its box. Fig. 12 is a sectional view through the clock-box. Fig. 13 is an enlarged plan view of the cylinder and clock-work box. Figs. 14 and 15 are details, Fig. 14$^a$ being a section of the devices shown in Fig. 14. Fig. 16 is an elevation, partly in section, of a modified form of velocimeter. Fig. 17 is a view, partly in section, taken at right angles thereto. Fig. 18 is a horizontal section on line 18 18 of Fig. 16. Fig. 19 is a view of the automatic regulator. Figs. 20 and 21 are modifications showing, respectively, the devices used with light and heavy fluid. Figs. 20$^a$ and 21$^a$ show a device in which a light and a heavy fluid are used. Fig. 22 illustrates still another form. Fig. 23 is a modification showing means for preventing the oil from being driven out by the force exerted upon the water, and Fig. 24 shows a diagram developed for twenty-four hours.

Before entering into a detailed description of the parts a brief description of the principle will be appropriate.

Although the velocimeter could easily be modified to measure the velocity of currents in either direction, yet I will assume that the flow of the water in the main is always in the same direction, and that the velocimeter will be placed far enough below and away from the main so that no heat can be communicated to the instrument proper. The fluid interposed between the columns of water may be lighter or heavier than water; but it must not mix with the latter. As will be seen a little later on, it is also feasible to employ two interposed fluids, one of which shall be heavier than water and the other lighter than water.

The simplest form of instrument to illustrate the operation of the velocimeter is shown in Figs. 20 and 21. In the former a fluid heavier than water is interposed between the columns of water, while in the latter a fluid lighter than water is employed, it being located normally in the central siphon-tube. The water in the main above, into which the tubes 1 open, is represented as being at rest in the left-hand portion of each of these figures and in the right-hand side as being displaced by the combined impact in the left-hand tube and suction in the other. As the velocity of the stream in the main increases, of course the more the interposed fluid (represented by shaded lines) is displaced, and, on the other hand, the less the velocity the less is the interposed fluid displaced.

It is now important to accurately prepare a scale or diagram, by precise mathematical calculations, which shall represent the velocity necessary to cause the interposed fluid to rise to certain heights and also such velocity as will allow it to drop; and, although it is unnecessary to explain how all these equations are arrived at here, I have prepared these formulæ and applied the results to the diagram shown in Fig. 24. The problem which now presents itself is, How is the fluctuation in height of this interposed fluid to be recorded upon this diagram? and my present invention consists, primarily, in photographing or printing, as it were, an exact diagram of these fluctuations upon the prepared scale; but before entering into an explanation of the instrument and its modifications which accomplish this result one point more in explanation of the principle is opportune. It is impossible to find fluids which would have exactly the specific gravities required for a particular velocity besides fulfilling the other conditions necessary—namely, that the interposed fluids must not mix with or dissolve in water, that it must possess great fluidity and velocity and should not adhere to the sides of the glass tubes in which the height of columns prevailing at different velocities is to be observed. In my experiments I have found but three fluids which give satisfaction—viz., naphtha, oil of turpentine, and oil of cajeput. To be sure, there is a number of essential oils—such as oil of sassafras, cinnamon, cassia, and the like—of a specific gravity but slightly exceeding the specific gravity of water which might answer; but these have been tried with unsatisfactory results, so that the three above mentioned are principally relied upon. Of fluids heavier than water, mercury alone has proved satisfactory. So in Figs. 20 and 21, already referred to, mercury and naphtha are employed, respectively; but when mercury alone is used the fluctuations are very slight. A velocity of ten feet per second would produce a difference in height of column of only 2.62 inches, and if, as previously hinted at, only the rise and fall in one of the tubes of the velocimeter was to be recorded by rays of light acting on sensitized paper, as will be explained, the diagram would not exceed 1.311 inch in height. On the other hand, the naphtha velocimeter, or the one having an interposed fluid lighter than water—such as oil of cajeput—would require glass tubes and recording-cylinders, respectively, fifty-five inches and three hundred and thirty inches in height, and the total height of the tubes would therefore have to be twice as high, or, respectively, one hundred and ten and six hundred and sixty inches; but this is impracticable, and it is desirable to so arrange the tubes and fluids that the diagram employed need not be more than ten inches in height for a velocity of ten feet per second. The above condition would only be satisfied if a liquid could be used of a specific gravity of 2.651, which would also possess all the other qualities heretofore mentioned.

Heretofore in the form of velocimeter described the water-tubes and recording-tubes have been of the same sectional area; but it is always possible to reduce the height of the columns from which the record is to be taken, and consequently the height of the recording-cylinder and of the diagram, to any desired height by giving to the recording-tube, or at least that portion of it which will be reached by the liquid, (lighter than water,) while the velocity of the hot water in the main increases from zero to ten feet per second, a larger sectional area than the other tube. For instance, in Figs. $20^a$ and $21^a$ the cylinder C could not well be made of glass, and if it could be made of glass would, on account of its large diameter, prevent the passage of a ray of light; but a glass tube C' is placed alongside and some distance from the cylinder C. All of the other parts are of metal. The record is taken from this tube; but the tube 1 in this instance has to extend vertically about one hundred and ten inches between the main and the instrument proper. When this is objectionable, different fluids may be used, mercury for one and the other naphtha—that is, one heavy and the other light. By this arrangement the tubes 1 need only be twice the length of the glass recording-tube. The use of the heavy and the light fluid is demonstrated by Figs. 22 and 23. The former shows the position when the water in the main is at rest, and the latter when the water in the main is in motion. In this form the tubes 1 are the same as before, and naphtha is used in the siphon and glass tube 2, but mercury is used in the cylinders 3 and 4. These cylinders are connected by glass tubes $j'$ and $j^2$, the upper of which has a cock 7, which, when the water in the main is at rest, is kept open, but, as soon as the water moves, this cock 7 is closed, and the pressure is exerted on the left-hand column or cylinder of mercury, as indicated in Fig. 23. This pressure displaces the mercury, as indicated, the latter displaces the water above it and between it and the naphtha, and the naphtha fluctuates in the glass tube from which the record is made.

So much will suffice for the principle of the instrument, and it is intended to render the following description more comprehensive.

A represents the main. This is preferably about four feet in length and as many inches inside diameter. This main should be made of cast-iron bored out to a uniform diameter, and, as shown in the drawings, is provided with flanges $a$ at the ends. A short distance from the ends of this main ferrules $b$ are secured into the latter. These ferrules are so arranged that the bent tubes can be withdrawn from the main for inspection or repairs without allowing any of the hot water to escape from the main and without emptying it. Cylindrical boxes B slide into these ferrules and are held therein by means of clamp-screws $d$. These boxes have a stuffing-box $e$ at one end and a screw-follower $e'$ for tightening the latter, and in each box B a tube 1 is guided by means of the collars $f$. The tubes are of metal, and at the extreme upper end are bent at right angles. A small flat plate $f'$ is affixed to each cylindrical box below the stuffing-boxes. Said plates are set exactly parallel to the bent end of the tubes 1. Their use is for placing the tubes 1 in the proper direction parallel to the center line of the main before being permanently fastened therein by means of the stuffing-boxes. When the tubes 1 are for any reason to be withdrawn from the main, they are first lowered (after the stuffing-box has been slightly relieved) until the bent ends touch the upper ends of the cylindrical boxes, the cocks $q$ in the pipes having been previously closed and the couplings $h$ having been disconnected. The cylindrical boxes may then be withdrawn until they clear the cocks D in the ferrules, in which position they are held by a small chain or otherwise (not shown) until the cock D has been closed. Then the pipes may be removed with facility without allowing any water to escape from the main. When the pipes are to be again introduced into the main, they are applied in reverse order. The brass tubes 1 have a bend 1' just below the couplings $h$, to prevent strains arising from changes in temperature.

A pair of cast-iron cylinders 3 4 is secured by bolts $i^2$ to the brass base-plate $i^3$. These cylinders are both bored out to exactly the same diameter throughout their entire length, and one of the tubes 1 enters the top of cylinder 3, while one end of siphon-tube $j$ extends out of the top of the other cylinder 4. The two cast-iron cylinders are connected by two glass tubes $j'$ $j^2$, one at the bottom and the other at the top, and the latter is provided with a cock 7, whereby it may be opened while the water in the main A is at rest and closed when it is in motion. These cylinders are preferably nickel-plated inside to prevent corrosion when the mercury is placed therein. The box $k$, in which the revolving cylinder $k'$ is placed, is also bolted or otherwise secured to the brass plate $i^3$. One portion of this box is cylindrical in shape, as shown in Figs. 4 and 5, to receive the silvered copper or brass recording-cylinder, and the other portion $k^2$ is narrow, having a curved back $k^3$, as shown in Fig. 2, in which there is a parabolic mirror $l$, adapted to reflect and concentrate the light thrown thereon. The portion of the siphon-tube $j$ in the box $k$ is glass and is designated a "recording-tube" $1^a$, and one of the tubes 1 is connected with the lower end of this tube, as shown in Fig. 2. The recording-tube is covered with tin-foil, into which two narrow slots $p^5$ are cut opposite each other, as most clearly shown in Fig. 17, so that the horizontal rays of light reflected by the parabolic mirror, after passing through the slots in the glass tube and the water contained therein, can act upon the sensitized paper, with which the recording-cylinder is lined. The light for accomplishing this is contained in a lamp-box $m$, off to one side, and a tube $m'$ connects this lamp-box with the recording-cylinder box. A glass lens $n$ (see Fig. 15) at the end of this tube $m'$ concentrates the rays of light on the recording-cylinder as the latter revolves, and this cylinder reflects the light back to the parabolic mirror, whence it is again reflected by the latter in a horizontal direction upon the glass recording-tube. The location of this tube is contiguous to the revolving cylinder, so that the light passing through it is recorded upon the diagram shown in Fig. 24. In this diagram the column of figures on the left represents the number of feet of water per second passed and the number over the top represent the twenty-four hours of a day. The cylinder revolves once during twenty-four hours, and the irregular line indicates the record of velocity. The recording-cylinder is journaled on an axis $o$, and the lower end of this is stepped in an adjustable screw $o'$, whereby the cylinder may be elevated or lowered, in order that the diagram may be in the right place relative to the recording glass tube. The cover of the box $k$ is made in halves, each of which is pivoted upon a part $o^2$ and provided with a half-bearing $o^3$ in the center, which, when the half-covers are closed over the cylinder, forms a bearing and lateral support for the upper end of the axis. When these half-covers are open, they rest on brackets $o^4$.

Box $p$, immediately adjacent to box K, contains clock-work or similar mechanism for actuating the recording-cylinder.

A number of cocks $q, r, s,$ and $t$ in the tubes are manipulated when the different parts of the instrument are charged with the fluids.

In Fig. 16 a modification is shown, and in Figs. 17 and 18 different views of this modification are shown. In this construction $k$ represents the box, in one compartment of which the cylinder $k'$ is located. The axis $o$ of this cylinder is journaled at the lower end in clock-box $p$, where it is actuated by suitable clock-works. The upper end is supported by hanger $p'$. The siphon-tube $j$ extends along in close proximity to the cylinder, one branch or leg being on the opposite side of the cylinder and the other composed of glass in an opening in the partition. This tube is covered with tin-foil $p^4$, and a narrow slot $p^5$ is formed in this tin-foil next to the cylinder. A parabolic mirror $l$ is located in the rear of the cylinder-box, and onto this mirror light radiates from the carbon-points $p^2$, as indicated by the dotted lines, and thence it is reflected back in a horizontal line through the glass tube to the cylinder. Now, as the naphtha in the tube fluctuates an impression is made, as before, upon the sensitive paper lining the recording-cylinder. By means of the cocks $r$ and $s$ the siphon-tube is filled or emptied.

It is clear that if the velocity in the main rises above a certain number of feet per second the oil or light fluid will all be driven into the glass recording-tube, and that some of it will be driven into tube 1 when the water begins to flow through the tubes. To prevent such an occurrence, it is necessary to stop the water from flowing through the tubes by closing a cock in one of the tubes 1. This cock may be manipulated by an attendant, if the time at which the change in velocities is to occur is previously known. It can be done automatically by adding a third velocimeter and arranging the three $a\ b\ c$ as shown in Fig. 19. In this figure velocimeter $a$ is filled with mercury and naphtha, $b$ with oil of cajeput, and $c$ with mercury. All three of these are shown as they appear when the water in the main is at rest. The cylinder 12 in velocimeter $c$ has a diameter ten times greater than the diameter of the glass recording-tube $l'$ and therefore a sectional area one hundred times greater.

In the glass tube two copper wires are fixed—one 13 with a point bent downward, so that the point is within a fraction of an inch of the mercury or above line $x\ x$ when the water in the main is at rest, and the other 14 about an inch above the lower end of the glass tube, so as to reach into the mercury. An electromagnet 15 is fixed near the cock $t$ in tube 1. The copper wire 13 in the glass tube above line $x\ x$ is connected with the electro-magnet 15, thence leading to a galvanic battery, while the other pole of the battery is connected by a copper wire with the wire 14 in the glass tube. The cock $t$ is open when there is no flow, and the armature 16 is off the magnet as long as the ends of the wires 13 and 14 are not brought into electrical contact; but when the water in the main begins to flow the mercury in the cylinder will be depressed and the column in the tube will rise. When this mercury rises high enough to touch the wire 13, the circuit is closed, the armature is attracted by the electro-magnet, and the armature closes cock $r$.

It is evident that slight changes might be resorted to in the form and arrangement of the several parts described without departing from the spirit and scope of my invention; hence I do not wish to limit myself to the particular construction herein set forth; but, Having fully described my invention, what I claim as new, and desire to secure by Letters Patent, is—

1. In a velocimeter, the combination, with a main and tubes connected therewith, of a recording transparent tube communicating with said tubes, and means for marking a line for defining the fluctuations of a fluid contained in the recording-tube by the action of a ray of light across the fluid in the recording-tube, substantially as set forth.

2. In a velocimeter, the combination, with a recording-tube containing a fluid held in a state of unstable equilibrium by the combined impact and draft of a running fluid, of means for photographing the fluctuations of said fluid, substantially as set forth.

3. In a velocimeter, the combination, with a main and tubes connected therewith, of a recording glass tube communicating with said tubes, a rotary recording-cylinder, a light, and means for concentrating the rays of light and throwing the same upon the glass tube and cylinder, substantially as set forth.

4. In a velocimeter, the combination, with a main and tubes connected therewith, of a recording glass tube, and means for throwing a light upon the tube, concentrating the rays of light, and means for recording the fluctuations of fluids in said glass tube, substantially as set forth.

5. The combination, with a main, a pair of vertical tubes in communication therewith, a siphon-tube, a recording glass tube, and cylinders, of a rotary recording-cylinder, a lamp-box, a tube connecting said box with the box containing the rotary cylinder, and means for reflecting and concentrating the rays of light upon the rotary cylinder, substantially as set forth.

6. The combination, with a recording glass tube, a recording-cylinder, means for rotating the latter, a light-box, and a tube connecting the latter with the cylinder-box, of a lens for concentrating the rays of light, and a parabolic mirror for reflecting the light, substantially as set forth.

7. The combination, with a recording glass tube, a recording-cylinder, means for rotating the latter, means for adjusting it vertically, and a tube connecting the latter with the cylinder-box, of a lens at the end of the tube for concentrating the rays of light, and a parabolic mirror for reflecting the rays, substantially as set forth.

8. The combination, with a cylinder, a box for holding the latter, and mechanism for turning the cylinder, of a screw for adjusting the cylinder and doors over the top of the cylinder adapted when closed to form a journal-box for the axis of the latter, substantially as set forth.

9. The combination, with a main, vertical tubes in connection therewith, said tubes having bends and cocks therein, substantially as described, a siphon-tube, a recording glass tube, and mercury-cylinders, of a rotary recording-cylinder, a light box, a tube connecting the latter with the cylinder-box, a lens for concentrating the rays of light, and a parabolic mirror for reflecting the light upon the recording glass tube, and the revolving cylinder, substantially as set forth.

In testimony whereof I have signed this specification in the presence of two subscribing witnesses.

HENRY FLAD.

Witnesses:
  WM. WISE,
  EMORY S. FOSTER.